United States Patent
Shatdal

(10) Patent No.: US 7,917,462 B1
(45) Date of Patent: Mar. 29, 2011

(54) MATERIALIZING SUBSETS OF A MULTI-DIMENSIONAL TABLE

(75) Inventor: Ambuj Shatdal, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 517 days.

(21) Appl. No.: 11/983,688

(22) Filed: Nov. 9, 2007

(51) Int. Cl.
*G06F 7/00* (2006.01)
*G06F 17/30* (2006.01)

(52) U.S. Cl. .................... 707/600; 707/717; 707/802

(58) Field of Classification Search .......... 707/600, 707/717, 802
See application file for complete search history.

(56) References Cited

U.S. PATENT DOCUMENTS

| | | | |
|---|---|---|---|
| 5,640,584 A | 6/1997 | Kandasamy et al. | |
| 5,799,300 A * | 8/1998 | Agrawal et al. | 707/5 |
| 5,864,842 A | 1/1999 | Pederson et al. | |
| 5,872,904 A | 2/1999 | McMillen et al. | |
| 5,884,299 A | 3/1999 | Ramesh et al. | |
| 6,275,818 B1 * | 8/2001 | Subramanian et al. | 707/2 |
| 6,356,890 B1 * | 3/2002 | Agrawal et al. | 707/2 |
| 6,594,653 B2 * | 7/2003 | Colby et al. | 707/3 |
| 6,829,621 B2 * | 12/2004 | Keller | 707/104.1 |
| 7,133,865 B1 * | 11/2006 | Pedersen et al. | 707/3 |
| 7,366,730 B2 * | 4/2008 | Greenfield et al. | 707/102 |
| 7,529,752 B2 * | 5/2009 | Hinshaw et al. | 707/10 |
| 2002/0077997 A1 * | 6/2002 | Colby et al. | 707/1 |
| 2002/0091707 A1 * | 7/2002 | Keller | 707/104.1 |
| 2003/0004959 A1 * | 1/2003 | Kotsis et al. | 707/100 |
| 2003/0208506 A1 * | 11/2003 | Greenfield et al. | 707/102 |
| 2004/0064456 A1 * | 4/2004 | Fong et al. | 707/100 |
| 2004/0117037 A1 * | 6/2004 | Hinshaw et al. | 700/2 |
| 2004/0215626 A1 * | 10/2004 | Colossi et al. | 707/100 |
| 2008/0033914 A1 * | 2/2008 | Cherniack et al. | 707/3 |
| 2008/0183667 A1 * | 7/2008 | Li et al. | 707/2 |
| 2009/0006346 A1 * | 1/2009 | C N et al. | 707/4 |
| 2009/0327330 A1 * | 12/2009 | Abouzied et al. | 707/102 |

OTHER PUBLICATIONS

Rao et al.—Spatial Hierarchy and OLAP-favored search in Spatial Data warehouse—proceddings of the 6th ACM international workshop on data warehousing and OLAP—New Orleans, Louisiana, USA, copyright 2003 ACM (pp. 48-55).*
Jensen et al.—"Specifying OLAP Cubes on XML Data"—Journal of Intelligent Information Systems—17:2/3, 2001 (pp. 255-280).*
Pedersen et al.—"Extending Practical Pre-Aggregation in On-Line Analytical Processing"—Sep. 20, 1999, Citeseer (pp. 1-33).*
F. Dehne et al., "Computing Partial Data Cubes for Parallel Data Warehousing Applications," 8 pages, vol. 2131 (2001).
I.S. Mumick et al., "Maintenance of Data Cubes and Summary Tables in a Warehouse," pp. 1-26, In the Proceedings of the ACM SIGMOD (1997).
A. Saxena et al., U.S. Appl. No. 10/636,885, "Performing Cube-Based Operations in a Database System,", filed Aug. 6, 2003, pp. 1-20, Figs. 1-4C.

(Continued)

Primary Examiner — John E Breene
Assistant Examiner — Anh Ly
(74) Attorney, Agent, or Firm — Trop, Pruner & Hu P.C.

(57) ABSTRACT

A multi-dimensional table having plural dimensions is stored in a database system, where plural grouping combinations of the plural dimensions define corresponding subsets of the multi-dimensional table. An aggregate measure for each of at least some of the plural subsets is computed, where the aggregate measure for a particular subset represents a relationship of the particular subset to one or more parents of the particular subset. Less than all of the at least some subsets are selected to materialize based on the aggregate measures.

23 Claims, 3 Drawing Sheets

OTHER PUBLICATIONS

H. Gui et al., U.S. Appl. No. 10/706,656, "Maintaining Views of Cube-Based Operations in a Database System,", filed Nov. 11, 2003, pp. 1-22, Figs. 1-4.

A. Shukla et al., "Materialized View Selection for Multidimensional Datasets," Proceedings of the 24$^{th}$ VLDB Conference, New York, pp. 488-499 (1998).

V. Harinarayan et al., "Implementing Data Cubes Efficiently," Proceedings of ACM SIGMOD Int. Conf. on Management of Data, pp. 1-26 (1996).

T.P. Nadeau, "Achieving Scalability in OLAP Materialized View Selection," DOLAP '02, pp. 1-11 (2002).

I.S. Mumick et al., "Maintenance of Data Cubes and Summary Tables in a Warehouse," Proceedings of SIGMOD '97, AZ, USA, pp. 100-111 (1997).

F. Dehne et al., "Computing Partial Data Cubes for Parallel Data Warehousing Applications," 8 pages (2001).

S. Sarawagi et al., "On Computing the Data Cube," pp. 1-18 (1996).

J. Gray et al., "Data Cube: A Relational Aggregation Operator Generalizing Group-By, Cross-Tab, and Sub-Totals," pp. 1-9 (1995).

R. Tewari, "Optimizing Cube Performance with OLAP Services: Processing times for each storage type," pp. 1-4, printed from http://www.sqlmag.com (as early as Sep. 2000).

R. Tewari, "Optimizing Cube Performance with OLAP Services: These test results reveal concrte steps you can take to improve multidimensional database performance," pp. 1-3,(as early as Sep. 2000).

IBM Redbooks, "DB2 OLAP Server Theory and Pratices," pp. 1-263 (2001).

* cited by examiner

MATERIALIZING SUBSETS OF A MULTI-DIMENSIONAL TABLE

BACKGROUND

A database is a collection of logically related data arranged in a predetermined format, such as in tables that contain rows and columns. Some database systems can store relatively massive amounts of data, such as databases that provide data warehouses against which on-line analytical processing (OLAP) can be performed.

A goal of OLAP systems is to be able to provide responses to queries from relatively large amounts of data residing in a data warehouse. A data warehouse can include a multi-dimensional relational table that can have a relatively large number of dimensions (also referred to as "attributes"). Providing responses to queries from a large multi-dimensional table in the data warehouse is computationally expensive, and can take a relatively long time.

A multi-dimensional table can be considered a "data cube," which can be a two-dimensional, three-dimensional, or even higher-dimensional cube. In attempting to improve database system performance, some conventional techniques materialize portions (sub-cubes) of the data cube. Certain queries can be satisfied from the sub-cubes, which can improve the speed at which such queries are processed.

A difficulty faced by developers is the issue of selecting sub-cubes to materialize. Due to storage constraints, it is impractical to store all possible sub-cubes of a data cube. Conventionally, the selection of which sub-cubes to materialize is based on techniques that either involve relatively large computational time (which is impractical for very large databases), or do not provide satisfactory selection of sub-cubes to materialize.

SUMMARY

In general, a technique or mechanism is provided to select subsets of a multi-dimensional table to materialize. The selection of subsets is based on measures that represent relationships of certain subsets of the table to parents of such subsets.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
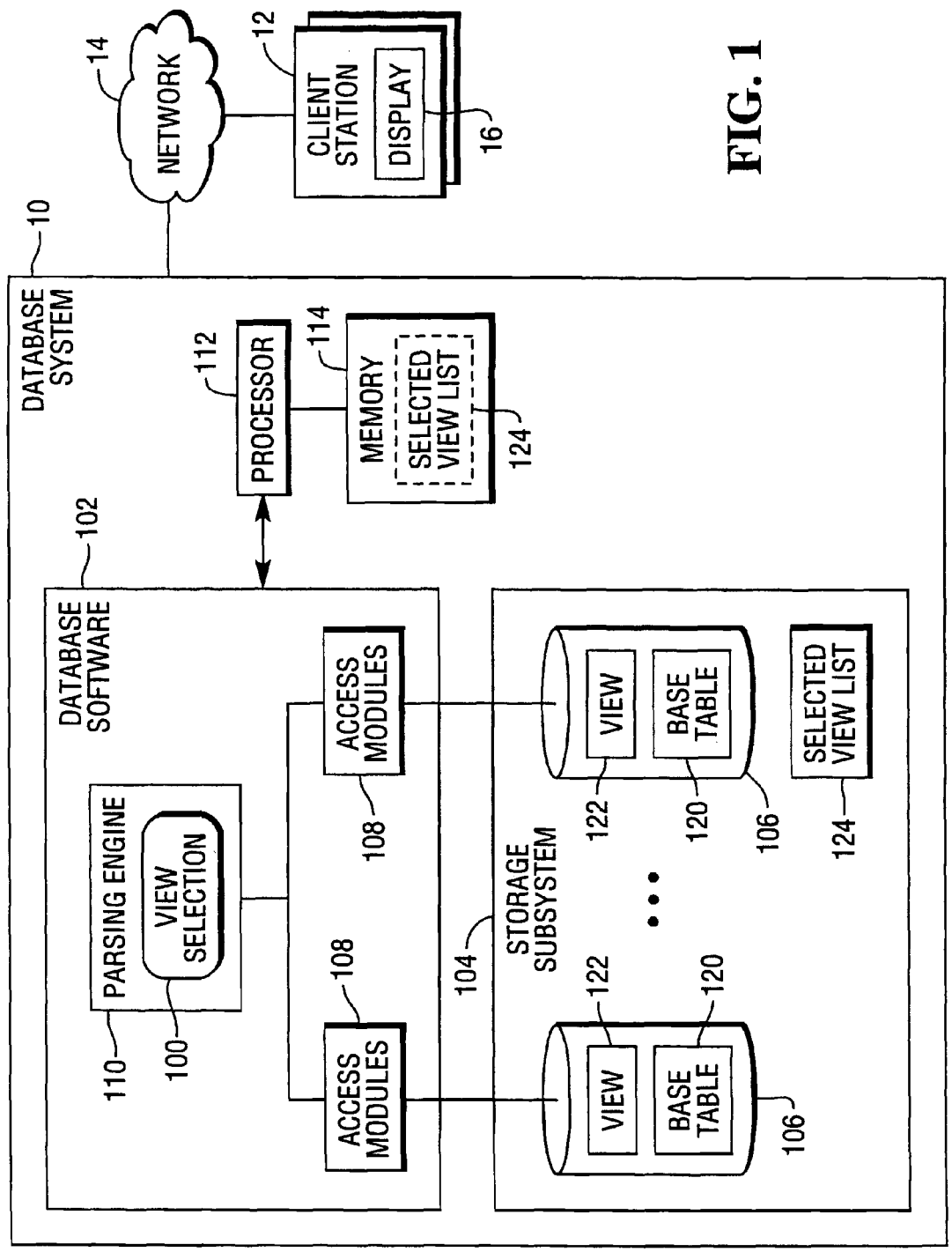
FIG. 1 illustrates an example arrangement that includes a database system that is coupled to one or more client stations, where the database system incorporates an embodiment of the invention.

FIG. 1 illustrates an example arrangement of a relational database system 10 that is capable of performing cube or partial cube operations (more generally referred to as "cube-based" operations). The cube or partial cube operations are performed by cube or partial cube operators (more generally "cubed-based" operators), such as those invoked by Structured Query Language (SQL) SELECT statements that have a GROUP BY clause which specifies GROUPING SETS, CUBE, or ROLLUP, according to one example implementation.

A SELECT statement that specifies a cube-based operation often includes a GROUP BY clause with multiple grouping sets. For example, for a relational table having multiple attributes A, B, C, and D, the grouping sets specified by an example partial cube query may be as follows: A, AB, BC, CD, DE, and DAB. The relational table with multiple attributes is also referred to as a "multi-dimensional table." The preceding example involves a partial cube operation that includes six grouping sets corresponding to six group-by operations: group-by on A, group-by on A and B, group-by on B and C, group-by on C and D, group-by on D and E, and group-by on D, A, and B. A partial cube query specifies less than all possible grouping sets of a table; on the other hand, a cube query specifies all possible grouping sets of grouping attributes. The grouping sets specified by a cube-based query make up a list of specified group-by operations to be performed in a cube-based operation.

The database system 10 can be part of a data warehouse, such as a data warehouse used in an on-line analytical processing (OLAP) system, in one example implementation. Note that in other implementations, the database system 10 can be used in other applications. The database system 10 is accessible by one or more client stations 12, such as desktop computers, portable computers, personal digital assistants, mobile telephones, and so forth, over a data network 14, which can be a local area network (LAN), a wide area network (WAN), the Internet, and so forth.

The client stations 12 are able to submit queries, such as SQL queries, to the database system 10 for processing. The SQL queries submitted can be queries to retrieve information stored in one or more tables in the database system 10, or to update, delete, or insert information into one or more tables in the database system 10. Results produced by the database system 10 in response to the queries submitted by the client stations 12 are output by the database system 10 for communication over the data network 14 back to the client stations 12, where the results can be stored in the client stations 12 or presented for viewing, such as in display devices 16 of the client stations 12.

As further depicted in FIG. 1, a storage subsystem 104 of the database system 10 includes multiple storage modules 106. Note that the storage modules 106 can be physical storage devices or logical partitions of the storage subsystem 104. In a different embodiment, instead of providing multiple storage modules 106 over which table(s) in the database system 10 can be distributed, a single storage module is provided.

As depicted in the example of FIG. 1, a base table 120 is stored in the storage modules 106, with different portions of the base table 120 distributed across different storage modules 106. For purposes of this discussion, the base table 120 is assumed to be a multi-dimensional base table with plural attributes (dimensions). Plural grouping combinations of the plural attributes can be defined, such as in a cube-based query, with each grouping combination (also referred to as "grouping set" above) specifying a corresponding subset of the table 120. In other words, different grouping combinations correspond to different subsets of the base table.

If the base table is considered a data cube (an N-dimensional cube, where N≧2), then the subsets of the base table corresponding to the grouping combinations are considered sub-cubes. As used herein, a "table" can refer to a relational table, a segment of the relational table, or any other collection of tuples (rows).

The database system 10 includes a view selection routine 100 (or multiple view selection routines 100) called by database software 102 running in the database system 10, for selecting subsets (sub-cubes) of the multi-dimensional table 120 to materialize. The subsets or sub-cubes are considered potential views that can be materialized. The materialized subsets (which correspond to different grouping combinations) are referred to as materialized views 122. The materialized views 122 can be used by the database software 102 during processing of queries. Satisfying a query from a materialized view is typically more efficient than satisfying the query directly from the base table, which can be quite large (e.g., millions of rows).

In accordance with some embodiments, the selection of subsets of the multi-dimensional table 122 to materialize as materialized views is based on measures that are computed by the view selection routine 100, where each measure represents a relationship of a particular subset to the parent(s) of the particular subset. In one embodiment, less than all of the subsets (which correspond to different grouping combinations) are selected for materializing into views 122 based on comparisons of the measures. The subsets with "better" measures are selected for materializing, where a "better" measure refers to a measure which indicates that the corresponding view is likely to provide better relative performance than some other view(s).

In FIG. 1, each storage module 106 is accessible by a respective access module 108 that is part of the database software 102. Each access module 108 is capable of performing the following tasks: insert, delete, or modify contents of tables; create, modify, or delete the definitions of tables; retrieve information from definitions and tables; and lock database and tables. In one example, the access modules 108 are based on access module processors (AMPs) used in some TERADATA® database systems from Teradata.

The database software 102 also includes one or more parsing engines 110. The parsing engine 110 includes a parser that receives a query (e.g., an SQL query). The parser parses the query and checks the query for proper syntax. Based on the query, the parsing engine 110 generates steps to be performed by the access modules 108, with the parsing engine 110 sending the steps (in the form of instructions or commands) to the access modules 108, which in turn perform operations on data or data structures (e.g., tables, views, and so forth) stored in the storage modules 106 in the storage subsystem 104.

As depicted in FIG. 1, the view selection routine(s) 100 is (are) part of the parsing engine 110. In alternative implementations, the view selection routine(s) 100 is (are) separate from parsing engine 110.

The example arrangement shown in FIG. 1 is a parallel database system that includes multiple access modules 108 that are executable concurrently to access data stored in respective storage modules 106. In an alternative embodiment, instead of a multiprocessing system, a uni-processing system is employed.

The database software 102 (including the parsing engine 110, access modules 108, and view maintenance routine(s) 100), along with other software modules, are executable on a processor 112, which is coupled to a memory 114. Other components (not shown) of the database system 10 include video components, network communication components to communicate with remote devices coupled over a network, and so forth. Examples of remote devices that can be coupled to the database system 10 are the client stations 12.

Figure 2:
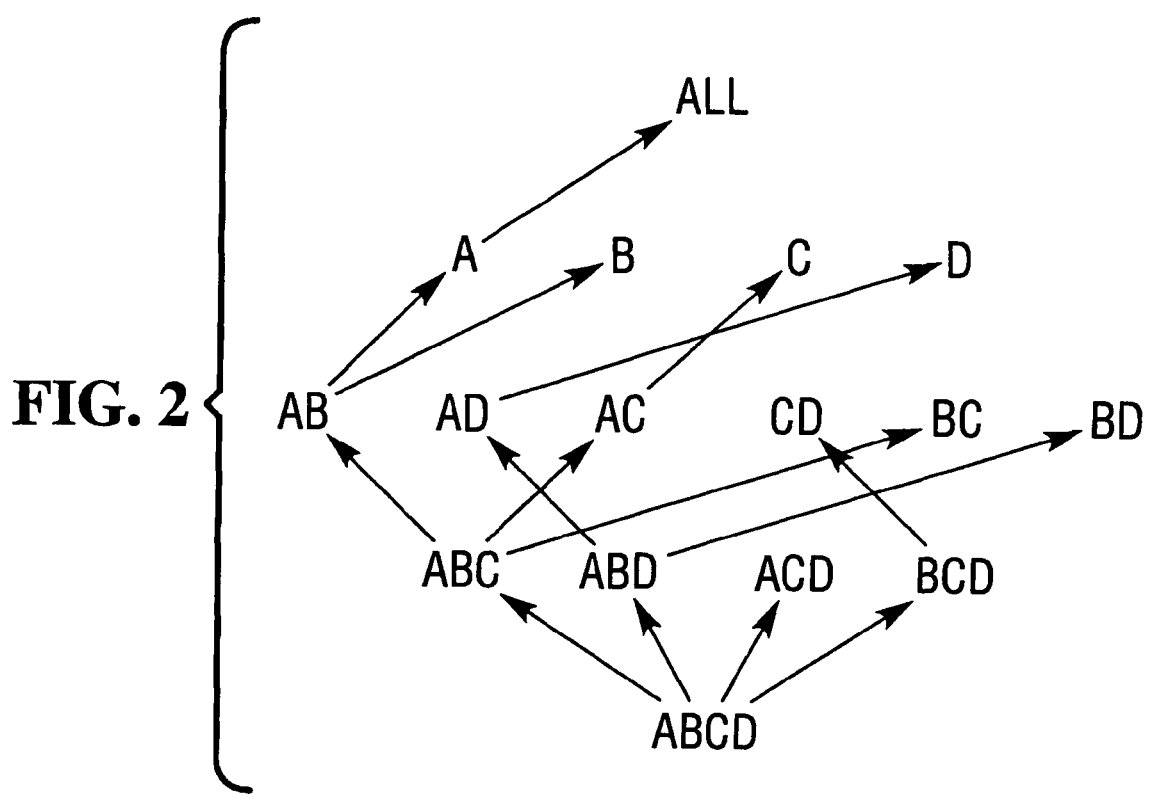
FIG. 2 illustrates an example lattice having nodes that represent subsets of a multi-dimensional table maintained by the database system according to an embodiment.

FIG. 2 shows an example of a lattice having nodes that represent possible grouping combinations for a multi-dimensional table that has attributes A, B, C, D. Sixteen possible grouping combinations are present, including: ABCD (which represents a grouping combination on all four attributes), ABC (which represents a grouping combination on attributes A, B, and C), . . . , D (which represents a grouping combination on attribute D), and "ALL" (which represents a group-by all operation in which A, B, C, D are each set to a NULL or don't care value). Node ABCD, which represents a group-by operation on the grouping combination A, B, C, D, is at a lowest level in the lattice. The lattice also has a node at level 0 (the highest level node), which is the ALL node. Note that the "lowest" level and "highest" level of the lattice can be reversed, with the ABCD node being designated the highest level node, while the ALL node is the lowest level node.

As indicated by the lattice arrangement depicted in FIG. 2, a parent-child relationship exists between subsets of the multi-dimensional table that correspond to the various grouping combinations. For example, ABC in FIG. 2 is a child of parent ABCD, AD is a child of parent ABD, and so forth. A first view corresponding to a first grouping combination is considered to be a child of a second view corresponding to a second grouping combination if the first view can be computed by elimination of a single attribute from the second view. Note that for purposes of clarity, not all edges reflecting all possible parent-child relationships are depicted in FIG. 2. An actual lattice will have edges between each possible parent-child combination of FIG. 2.

Let $v[i]$ denote the size of each of the possible views, where $i=1$ to M (M being the number of views). Alternatively $v[i]$ can also consider other factors that reflect the cost of computing one view from another. This includes a minimum view size threshold reflecting the minimum cost of I/O in the system. View $v[0]$ is the "ALL" view (with one row) and $v[MAX]$ is the lowest level view (e.g., view of ABCD in FIG. 2) in the schema. The view $v[i]$ is a child of $v[j]$ if $v[i]$ can be computed directly from $v[j]$. In some implementations, a view $v[i]$ is considered a child of view $v[j]$ if $v[i]$ can be computed indirectly from $v[j]$.

In accordance with some embodiments, a measure is calculated for each of the views $v[i]$ corresponding to different grouping combinations. In one example implementation, such measures are referred to as shrinkage measures. The shrinkage measure is an aggregated measure that compares the relative size of a particular view to the particular view's parent view(s). A relatively larger shrinkage (child view is relatively smaller than its parent view or views) indicates that the child view is likely to have captured more information such that its size is further reduced, which means that the child view may be a better candidate for materializing. Let $v[j_0], \ldots, v[j_{n-1}]$ be the n parents of view $v[i]$, and $s[j_x]=v[i]/v[j_x]$, where $s[i_x]$ is the individual shrinkage of view $v[i]$ for parent $v[j_x]$. In one embodiment, the individual shrinkage $s[j_x]$ represents a ratio of the size of the child view $v[i]$ to the size of the parent $v[j_x]$. Alternatively, $s[j_x]$ can be equal to the difference between the size of $v[i]$ and the size of $v[j_x]$. More generally, the individual shrinkage $s[j_x]=f(v[i], v[j_x])$, where $f()$ is some function, with one example being $v[i]/v[j_x]$ above.

If view $v[i]$ has multiple parents, then there will be multiple $s[i_x]$ values. The multiple $s[i_x]$ values are aggregated to obtain the overall shrinkage measure for view $v[i]$. The aggregation can be any one of the following: average (arithmetic mean), geometric mean, harmonic mean, median, minimum, maximum, and so forth. Note that if there is just one parent for view v[i], then there will only be one s[$i_x$] value, which would then be the shrinkage measure for view v[i].

The shrinkage measure for view v[i] is expressed as shrinkage[i], which is calculated as follows: shrinkage[i]=avg (s[$j_0$], . . . , s[$j_{n-1}$]). In other words, the shrinkage measure of a view v[i] that has multiple parent views is equal to the average of the individual shrinkages, s[$j_0$], . . . , s[$j_{n-1}$], of view v[i] with respect to the corresponding parent views.

Instead of using the "avg" function to compute the arithmetic mean of the shrinkage values, s[$j_0$], . . . , s[$j_{n-1}$], a different aggregate function can be used to compute another type of aggregate, such a geometric mean, harmonic mean, median, minimum, maximum, and so forth.

More generally, each shrinkage measure, shrinkage[i] of a view v[i], is computed based on an aggregated relationship of the size of the view v[i] to the view's parent view(s). In other words, shrinkage[i] is an aggregate over all the possible paths: shrinkage[i]=aggregate_function(s[$j_0$], . . . , s[$j_{n-1}$]).

Once the shrinkage measures for the various views corresponding to the various possible grouping combinations are computed, then such shrinkage measures can be used to select which of the views to materialize. In the example given above, a low shrinkage measure value (which means that the size of the child view is smaller relative to the size(s) of its parent(s)) indicates that the corresponding view would be more desirable to materialize.

Also, an additional heuristic can be defined, in accordance with some implementations, to select from among views whose shrinkage measures are less than some predefined threshold. This can substantially reduce the search space to improve database system performance. The predetermined shrinkage measure threshold can be selected by the database optimizer, can be set as a system constant, or can be determined using some other mechanism. Any views having shrinkage measure greater than the threshold can be discarded as candidates from consideration for materializing. In different implementations, discarding of candidates from consideration can be based on the shrinkage measure exceeding the predetermined measure threshold, or having some other relationship to the predetermined measure threshold.

Figure 3:
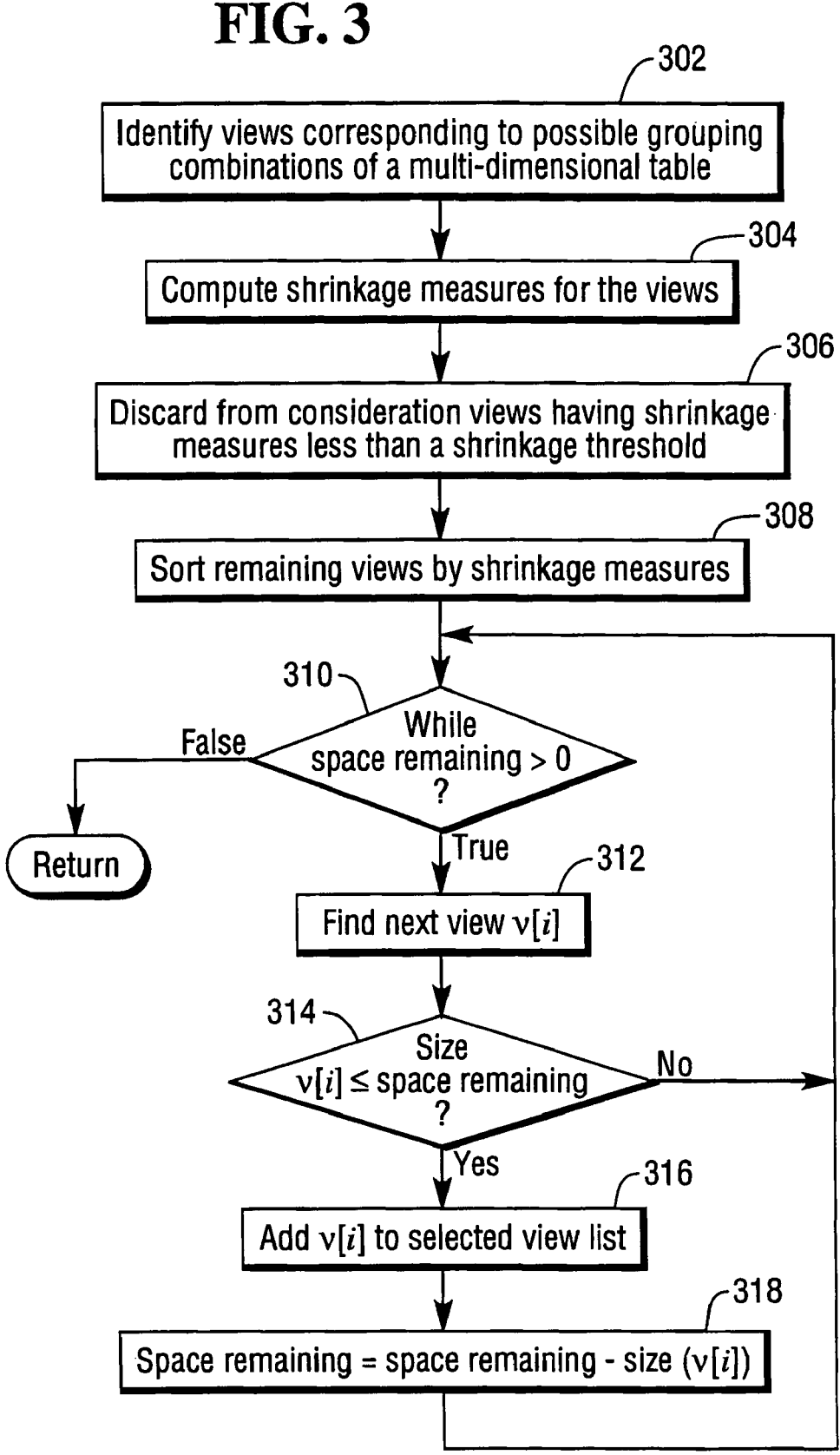
FIG. 3 is a flow diagram of a process of selecting subsets of a multi-dimensional table to materialize, according to an embodiment.

FIG. 3 is a flow diagram of a process of selecting views corresponding to different grouping combinations for materializing, in accordance with an embodiment. The process of FIG. 3 can be performed by the view selection routine 100 of FIG. 1, for example. The view selection routine 100 identifies (at 302) views that correspond to possible grouping combinations of a multi-dimensional table. Shrinkage measures are then computed (at 304) for at least some of the identified views. For example, the lowest level view (such as the view for grouping combination ABCD in FIG. 2), does not have a parent, so that a shrinkage measure may not be calculated for this lowest level view in some implementations. In other implementations, a shrinkage measure can be computed for this lowest level view.

Next, views having shrinkage measures less than a shrinkage threshold are discarded (at 306) as candidates for materializing. The remaining views are then sorted (at 308) by their shrinkage measures, where a lower shrinkage measure indicates a more desirable view for materializing, in this example implementation.

In one embodiment, a constraint is specified for selection of views. This constraint, in one example embodiment, can be the space available for storing materialized views. In other embodiments, other constraints can be specified. The space available is represented by a parameter SpaceRemaining, which is set to some initial value that indicates the total amount of space that is made available by the database system for storing materialized views for possible grouping combinations of a multi-dimensional table. While SpaceRemaining is greater than 0 (as determined at 310), the view selection routine finds (at 312) the next view, v[i]. If the size of v[i], Size(v[i]), is less than or equal to SpaceRemaining, as determined at 314, then v[i] is added (at 316) to a selected view list, which can be a data structure 124 in the storage subsystem 104 of FIG. 1. Alternatively, the selected view list 124 can be stored in the memory 114 of the database system 10, where the memory 114 can be a volatile memory that loses its content when power is removed from the memory 114.

The parameter SpaceRemaining is updated (at 318) by decrementing the size of v[i] from SpaceRemaining.

The process then returns to 310, where it is further determined whether SpaceRemaining is greater than 0. If SpaceRemaining is not greater than 0, then the view selection routine 100 returns. Note that if, at 314, it is determined that Size(v[i]) is greater than SpaceRemaining, then the process proceeds back to 310 to consider the next view.

By using techniques according to some embodiments for selecting views representing possible grouping combinations of a multi-dimensional table for materializing, a time-efficient and computation-efficient algorithm is provided for materializing such views. The shrinkage measures according to some embodiments provide relatively good indications of better views for materializing to improve database system performance in processing certain queries.

The database system discussed above includes various software routines or modules (including the database software 102 and other software components). Such software routines or modules are executable on corresponding control modules. The control modules include microprocessors, microcontrollers, or other control or computing devices. As used here, "processor" can refer to one or plural components.

Instructions of the software routines or modules are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by at least one processor in a database system, comprising:
    storing, in machine-readable storage media, a table having plural attributes, wherein plural grouping combinations of the plural attributes define corresponding plural subsets of the table, wherein at least some of the plural subsets have parents, wherein a particular one of the at least some subsets has multiple parents, wherein the multiple parents include corresponding given ones of the subsets of the table, and wherein each of the given subsets is a parent of the particular subset if the particular subset is computable from the corresponding given subset by elimination of an attribute from the corresponding given subset;

computing, by the at least one processor, measures for corresponding ones of the at least some subsets, the measures representing relationships of corresponding ones of the at least some subsets to respective parents of the at least some subsets; and selecting, by the at least one processor, less than all of the at least some subsets to materialize as materialized views based on the computed measures.

2. The method of claim 1, wherein computing the measures for corresponding ones of the at least some subsets comprises computing a measure for the particular subset that is an aggregate measure that compares a relative size of the particular subset to sizes of the corresponding parents of the particular subset.

3. The method of claim 2, wherein comparing the relative size of the particular subset to the sizes of corresponding parents of the particular subset comprises:

calculating ratios of the size of the particular subset to the respective sizes of corresponding parents of the particular subset; and aggregating the ratios to obtain the aggregate measure.

4. The method of claim 3, wherein aggregating the ratios comprises computing one of an average, geometric mean, harmonic mean, median, minimum, and maximum of the ratios.

5. The method of claim 2, wherein comparing the relative size of the particular subset to the sizes of corresponding parents of the particular subset comprises:

calculating differences between the size of the particular subset and the respective sizes of corresponding parents of the particular subset; and aggregating the differences to produce the aggregate measure.

6. The method of claim 5, wherein aggregating the differences comprises computing one of an average, geometric mean, harmonic mean, median, minimum, and maximum of the differences.

7. The method of claim 2, further comprising defining an additional heuristic to reduce a number of the at least some subsets to consider for materializing.

8. The method of claim 7, wherein defining the additional heuristic comprises defining a measure threshold, the method further comprising discarding subsets from consideration that are associated with corresponding ones of the measures having a predefined relationship with respect to the measure threshold.

9. The method of claim 8, wherein discarding the subsets from consideration comprises discarding the subsets that are associated with corresponding ones of the measures that are less than the threshold.

10. The method of claim 8, wherein discarding the subsets from consideration comprises discarding the subsets that are associated with corresponding ones of the measures that are greater than the threshold.

11. The method of claim 1, further comprising:
storing the selected subsets as the materialized views; and
processing a received query using at least one of the materialized views.

12. The method of claim 1, further comprising:
specifying a constraint,
wherein selecting less than all of the at least some subsets to materialize as materialized views is further based on the constraint.

13. The method of claim 12, wherein specifying the constraint comprises specifying a storage space available for storing the materialized views.

14. The method of claim 1, further comprising sorting the at least some subsets according to the measures associated with the at least some subsets, wherein selecting less than all of the plural subsets to materialize as materialized views is based on the sorting.

15. An article comprising at least one computer-readable storage medium containing instructions that when executed cause at least one processor in a database system to:

store a multi-dimensional table having plural dimensions, wherein plural grouping combinations of the plural dimensions define corresponding potential views of the multi-dimensional table;

compute an aggregate measure for each of at least some of the plural potential views, wherein the aggregate measure for a particular one of the at least some potential views represents a relationship of the particular potential view to parents of the particular potential view, wherein the parents of the particular potential view include corresponding given ones of the potential views of the multi-dimensional table, and wherein each of the given potential views is a parent of the particular potential view if the particular potential view is computable from the corresponding given potential view by elimination of an attribute from the corresponding given potential view; and select less than all of the at least some potential views to materialize based on the aggregate measures.

16. The article of claim 15, wherein the instructions when executed cause the at least one processor in the database system to further:

compute individual measures representing relationships of the particular potential view to the respective parents of the particular potential view, wherein computing the aggregate measure comprises aggregating the individual measures.

17. The article of claim 16, wherein aggregating the individual measures comprises computing an average of the individual measures.

18. The article of claim 16, wherein aggregating the individual measures comprises computing one of a geometric mean, harmonic mean, median, minimum, and maximum of the individual measures.

19. The article of claim 16, wherein the computed individual measures represent ratios of a size of the particular potential view to sizes of the respective parents of the particular potential view.

20. The article of claim 16, wherein the computed individual measures represent differences of a size of the particular potential view to sizes of the respective parents of the particular potential view.

21. A database system comprising:
a storage subsystem to store a multi-dimensional table having plural attributes, wherein plural grouping combinations of the plural attributes define corresponding subsets of the multi-dimensional table; and
at least one processor to:
compute an aggregate measure for each of at least some of the plural subsets, wherein the aggregate measure for a particular one of the at least some subsets represents a relationship of the particular subset to parents of the particular subset, wherein the parents of the particular subset include corresponding given ones of the subsets of the multi-dimensional table, and wherein each of the given subsets is a parent of the particular subset if the particular subset is computable from the corresponding given subset by elimination of an attribute from the corresponding given subset; and select less than all of the at least some subsets based on the aggregate measures.

22. The database system of claim 21, wherein the at least one processor is to further:

compute individual measures representing relationships of the particular subset to the respective parents of the particular subset, wherein the aggregate measure is an aggregate of the individual measures.

23. The database system of claim 22, wherein the computed individual measures comprise one of:

ratios of a size of the particular subset to sizes of the respective parents of the particular subset; and differences of the size of the particular subset to the sizes of the respective parents of the particular subset.

\* \* \* \* \*